United States Patent [19]

Bachman

[11] 4,095,824
[45] Jun. 20, 1978

[54] SECURE CONTEST CARD

[75] Inventor: Gilbert Bachman, Atlanta, Ga.

[73] Assignee: Dittler Brothers, Inc., Atlanta, Ga.

[21] Appl. No.: 701,959

[22] Filed: Jul. 1, 1976

[51] Int. Cl.² ........................................... S42D 15/00
[52] U.S. Cl. ........................................ 283/6; 273/39;
35/9 R
[58] Field of Search ............... 283/6; 35/9 R; 273/39

[56] References Cited
U.S. PATENT DOCUMENTS

| 2,986,820 | 6/1961 | Neville et al. | 35/9 R |
| 3,055,117 | 9/1962 | Bernstein et al. | 283/6 X |
| 3,938,993 | 2/1976 | Royka et al. | 35/9 R X |

Primary Examiner—Stephen C. Pellegrino
Attorney, Agent, or Firm—Jones, Thomas & Askew

[57] ABSTRACT

A secure contest card which is not susceptible to compromise by both simple and sophisticated techniques comprises printed indicia disposed on the upper surface of card stock material, a patterned intermediate layer disposed over the printed indicia and an opaque removable mask disposed over the intermediate layer and over the printed indicia. In a second embodiment of the invention a patterned background layer is disposed between the card stock and the printed indicia and the patterned intermediate layer is eliminated. In a third and preferred embodiment, the patterned background layer and the patterned intermediate layer are both employed. It has been found that the pattern in the background and intermediate layers creates an irregular relationship with the indicia and defeats certain new techniques for compromise of apparently secure contest cards.

5 Claims, 15 Drawing Figures

Fig_6
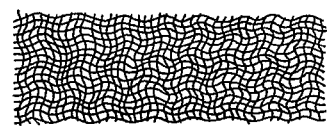
Fig_7
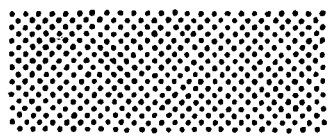
Fig_8
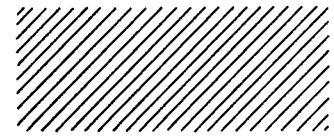
Fig_9
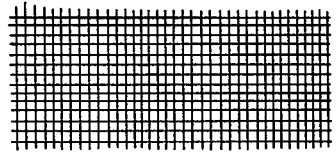
Fig_10
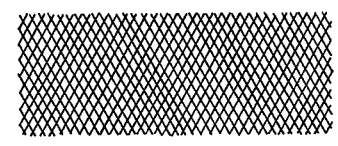
Fig_11
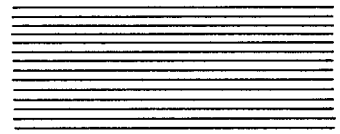
Fig_12
Fig_13
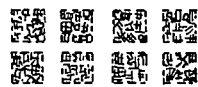
Fig_14
Fig_15

SECURE CONTEST CARD

This invention relates to a contest card bearing meaningful indicia such as words, numbers, messages or appropriate emblems or designs which have been covered by an opaque removable mask capable of being mechanically removed only through the destruction of the mask. More particularly the present invention concerns a secure contest card which includes a patterned layer immediately beneath printed indicia or immediately above printed indicia, or patterned layers both above and below printed indicia on the card.

Games involving a contest card bearing concealed information have become quite popular in the last few years. A typical example of such a card is an instant lottery ticket wherein a customer removes a concealing mask to discover the information printed thereunder. If the information meets the criteria of the contest involved, the customer wins the designated award. In order for contest card games, and particularly instant lottery games, to be successful the contest card must be secure against compromise. If it is possible for one to determine, through either simple or relatively sophisticated techniques, the indicia beneath the opaque mask without removing the mask, then the card is not secure and it is possible for one to compromise the card. If cards can be compromised and the word of such fact spreads among customers and potential customers, the scale of such cards normally will decrease drastically and the entire contest card game will fail. Consequently those involved in the manufacture and sale of contest cards are quite concerned about the security of contest cards.

The security of contest cards and the like have been the subject of previous patents including U.S. Pat. Nos. 2,764,821; 2,961,777; 2,986,820; 3,055,117; 3,508,344; 2,210,897; 3,823,022; 2,410,800; 3,877,155. While these patents have increased the security of contest cards and produced acceptable solutions to problems encountered, they have not provided the answer to more sophisticated methods of compromise. One particular technique has been developed recently wherein previously secure lottery tickets can be photocopied on a conventional photocopy machine, and the resulting paper photocopy will show the printed indicia in readable form and the opaque mask on the ticket will not be altered to any recognizable degree. Tickets produced according to the previous patents have been subjected to this method of compromise and have been found to be insecure.

Consequently, it is an object of the present invention to provide a contest card which is both convenient and economical to manufacture and is not susceptible to compromise by photocopy machines and other compromising techniques.

These and other objects, features and advantages of the present invention will become apparent from reviewing the following detailed description and the accompanying drawings in which:

FIGS. 6–15 show various patterns which are used in the printing of patterned layers according to the present invention.

Figures 1, 2:
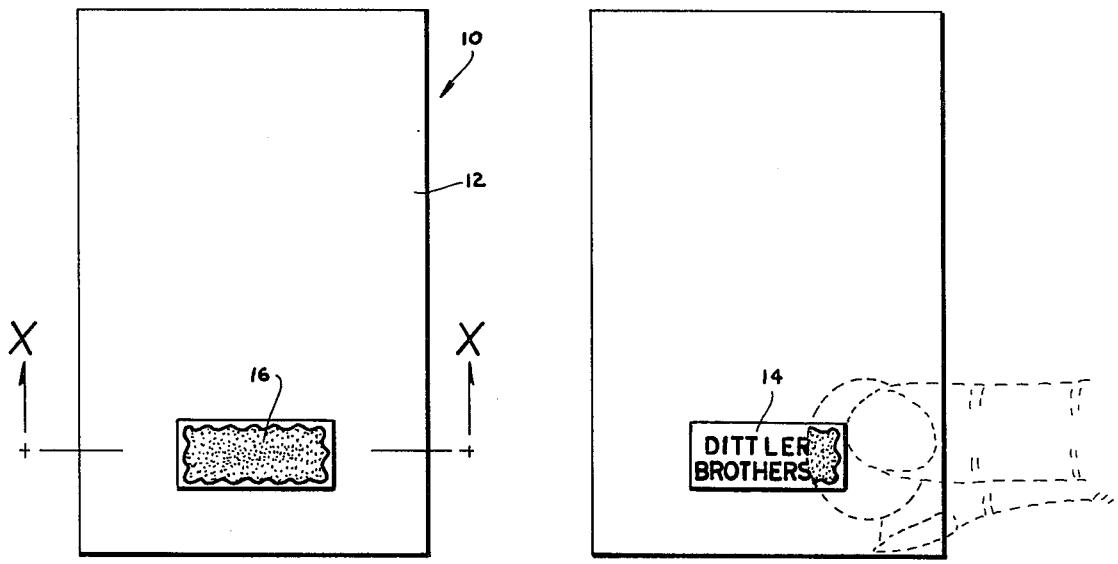
FIG. 1 is a top plan view of a contest card having an opaque mask over printed indicia on an area of the card.
FIG. 2 is a top plan view of the contest card of FIG. 1 showing one method of removal of the mask to expose the printed indicia.

The objects of the present invention are accomplished by utilizing patterned layers of material to render visually hidden indicia on a contest card indistinguishable to a photocopy machine and thus conceal the presence, absence, nature or position of the indicia. This result may be accomplished by careful attention to several factors including the design and position of the patterned layer. The patterned layer should not interfere with or inhibit the transmission of light rays from the indicia to the retinal screen of the eye and an observer must be capable of easily reading the indicia once the mask is removed. However, the patterned layer must render any light rays which may be transmitted from the indicia to the paper of a photocopy process indistinguishable from the light rays transmitted from the patterned layer to the paper so that the image which appears on the paper of the photocopy process does not disclose the hidden indicia.

According to the present invention a secure contest card 10 includes initially a base material 12 such as card stock. Conventionally card stock which is used in the manufacture of contest cards, such as instant lottery tickets, includes a layer of metallic foil either sandwiched into the middle of the card stock or distributed on the upper and lower surfaces of the card stock. The metallic foil contributes to the security of the card by reducing or eliminating the transmission of light through the card. It should be understood that other types of printing paper or other suitable medium could be used in place of the card stock.

Contest indicia 14 are printed on one surface of the card according to the rules of the game involved. Such indicia include words, numbers, messages or appropriate designs or emblems. In order to conceal the indicia from visual observation, the indicia are covered by a thin masking layer of elastomeric material 16 including sufficient opaque pigment material to render the mask opaque. The opaque mask is conventionally applied by silk-screen methods at a thickness of about 0.0005 to 0.0015 inches. The mask is applied in a fluent state to adhere to the face of the card stock and resist removal therefrom in one complete section. After drying the elastomeric mask is smooth, even, hard, non-sticky to the touch, resistant to chemical removal, and quite adherent to the face of the card stock. For mechanical removal, the mask may be abraded or scratched away with a suitable implement such as a fingernail, coin or pencil eraser. During removal the mask sections into strips or portions of strips and its integrity is destroyed thereby obviating the possibility of repositioning the mask over the indicia after its removal therefrom. Because of its elastomeric nature, the mask is easily applied to the card stock and when removed leaves a relatively clean surface so that the indicia can be easily read. It should be clearly understood that the present invention is not limited by the type of material used as the opaque mask and the elastomeric material disclosed herein is suggested as only one type of suitable opaque mask. Any type of covering material which will provide a suitable visual mask is contemplated by the present invention so long as it meets the criteria of masking the visual identification and recognition of the indicia therebeneath and is removable only in sections so that it cannot be repositioned after observation of the indicia.

The composition of a suitable elastomeric opaque mask is as follows:

| Ingredient | Amt in % or Parts by Weight | Commercial or Trade Name |
|---|---|---|
| Natural Rubber Resin(1) | 4.447 | PLIOLITE NR-50 |
| Styrene Butadiene Rubber Resin(2) | 10.717 | KRATON 101 |
| Antioxidant(3) | .075 | IONOL |
| Carbon Black(4) | 1.964 | ELF 75 |
| Extender(5) | .361 | Barium Sulphate |
| Aluminum Powder(6) | 14.470 | ALCAN 7100 |
| Wetting Agent(7) | .051 | Oleic Acid |
| Solvent for Rubber Resins | 10.934 | Stoddard(8) |
|  | 24.981 | SACO 100(9) |
|  | 32.000 | SACO 150(10) |

(1)Cyclized rubber compound having a specific gravity in the range of 1.00 to 1.10 and a softening point in a range of 50–70 Degrees C. PLIOLITE NR-50 is a product of Goodyear Tire & Rubber Co. of Akron, Ohio.
(2)Styrene butadiene blocked copolymer having a molecular weight in a range of 50,000 to 500,000 and a styrene content from 5 to 65%. KRATON 101 is a product of Shell Chemical Corp. of New York, New York.
(3)Benzyl or phenol type having a chemical structure similar to 1,3,5 trimethyl-2,4,6-tris (3,5 di-tert-butyl 4-hydroxy benzyl), or 2,6-di-tert-butyl 4-methyl phenol. IONOL is a product of the Shell Chemical Corp. of New York, New York.
(4)Any organic black pigment with a particle size range from 10–70 millimicrons. ELF 75 is a product of Cabot Corp. of Boston, Mass. Other inorganic and organic pigments can also be used.
(5)Any extender having a refraction index in a range of 1.40 through 1.75.
(6)Metallic powder having a surface area in a range of 3,000 to 25,000 cm2/gm. ALCAN 7100 is a product of Alcan Metal Powders, Inc., a subsidiary of Aluminum, Ltd. of Montreal, Quebec.
(7)Many types can be used - not essential.
(8)Aliphatic naphtha having a Kauri butanol value - 36, boiling point (distillation range) from initial 313 Degrees F. to end point 383 Degrees F. STODDARD is a product of American Mineral Spirit Company, New York, New York, a subsidiary of Atlantic Richfield Company. Otherpossible naphthas include those having a Kauri butanol value - range 23 through 38, boiling point (distillation range) from initial 305 Degrees F. to end point 333 Degrees F. and initial 425 Degrees F. to end point 465 Degrees F.
(9)Aromatic hydrocarbon having a Kauri butanol value - 94.8, boiling point (distillation range) from initial 320 Degrees F. to end point 350 Degrees F. SACO 100 is a product of Sherwood Solvents, American Mineral Spirit Co., Division of Union Oil of California.
(10)Aromatic hydrocarbon having a Kauri butanol value - 91.8, boiling point (distillation range) from initial 365 Degrees F. to end point 415 degrees F. SACO 150 is a product of Sherwood Solvents, American Mineral Spirit Co., Division of Union Oil of California.

Other solvents for the rubber resins can be used, including aromatic hydrocarbons having a Kauri butanol value in the range of from 80 through 104, and boiling point (distillation range) from initial 270° F. to end point 305° F. and from initial 360° F. to end point 540° F.

Various pigments can be substituted for the carbon black, and the aluminum powder can be eliminated entirely. The presence of the aluminum, however, increases the opacity of the mask and also helps insure that the mask will not be removed intact.

The construction of the card stock material of the present contest card is also non-critical to the present invention. The only requirements necessary are that the surface present a suitable texture for printing of the required information thereon and that the card stock material not permit the transmission of light therethrough. Preferably the card stock material is a relatively stiff paperboard material with a metal foil (normally aluminum) coating on the top and bottom surfaces. The surfaces, as coated, are relatively hard and smooth so as to permit printing of information thereon and removal of the mask therefrom.

At this point it should be clear that the present contest card includes those essential and conventional features required for the general type of contest card herein contemplated, i.e., card stock, indicia printed on the card stock and a removable opaque mask over the indicia. As explained earlier, such a contest card may not be susceptible to compromise by simple visual examination, but by more sophisticated but relatively inexpensive techniques those contest cards can be quickly and easily compromised.

In order to insure that such a contest card is impervious to compromise by these more sophisticated techniques, such as by examination with a photocopy machine, it has been found that complete temporary concealment of the indicia may be obtained through the use of an appropriately positioned patterned layer of material between the card stock and the opaque mask. Patterned layers of material have been used in the past as optical confusion patterns but such confusion patterns have consisted of irregular opaque areas and have always been positioned on the top surface or bottom surface of the card stock in order to optically confuse the visual observation of the contest card. In addition, others have used a combination of a patterned indicia together with an optical confusion pattern to confuse the visual observation of a contest card. Those standard confusion patterns have not been successful in defeating compromise of game cards when examined with suitable photocopy machines.

In the present invention a patterned layer of material is applied either immediately above or immediately below the indicia on the card stock. In a preferred embodiment of the present invention, both patterned layers are used to produce the maximum amount of security for the contest card. The pattern may comprise a plurality of light absorbing or light transmitting areas, such as lines, forms or spots separated from one another by physical or optical interstices, or light reflecting patterns, or light scattering or diffracting patterns. For any given indicia the pattern may advantageously combine any one or more elements of form, size, orientation and contrast which will best conceal the indicia by confusion as to the interpretation of the image obtained on the paper of a photocopy machine. It has been observed that a pattern is successful if the pattern is regular or irregular; if the pattern consists of the same indicia as that of the response and the pattern is translated and/or rotated in random registers; and if the pattern generally corresponds to the response in the prominent characteristics of the response such as curves, angles and solids. Also it has been observed that one may perfect a selected pattern which does not quite completely conceal the response by adding to the imperfect pattern irregular and unevenly spaced dots or a splash pattern in patches of similar size to the openings in the imperfect pattern.

It has been found that the presence or absence of color in the pattern layer does not affect its ability to conceal the indicia from compromise by the more sophisticated techniques. A pattern layer of no color so that it is completely transparent to visual observation, will perform in excellent fashion to conceal the indicia from compromise by the sophisticated techniques. This result is quite remarkable since the pattern layer will not be observed or recognized by visual examination of the contest card after removal of the opaque mask. However, the pattern layer is "seen" in the sophisticated techniques and will conceal the indicia. If desired, color can be used in the patterned layer so long as the color is not so intense as to conceal the indicia from visual examination.

It has been found that color in the pattern layer immediately beneath the indicia is desired so that the pattern layer may also function as a tamper-proof pattern to reveal any attempted modification of the printed indicia. It has also been found that color in the pattern layer immediately above the indicia is not desired since even slight color shading makes the indicia more difficult to read after removal of the opaque mask. The concealing characteristics of these pattern layers work equally well with or without color and there does not appear to be any security advantages gained by adding color to the layers.

It is recognized that fine screen dots have been used in the past as a background tamper proof pattern immediately beneath indicia on a contest card. Such a fine screen dot pattern does not conceal the indicia during examination of the card by the more sophisticated techniques.

It is to be noted that in selecting the design of a pattern to effect complete concealment, the area and shape of the interstices of such pattern and the area and shape of the printed portion of the pattern should be considered in light of the dimensions and shape of the matter to be hidden thereby. That is, it has been found that if at least approximately fifty percent of the response itself is actually covered by the pattern, complete concealment of the response is more readily obtained. It should be understood that by use of the word "covered" it is meant that the pattern when either below or above the indicia, covers or is beneath at least fifty percent of the indicia. It is important and most critical to recognize, however, that if the layer beneath or above the indicia is a continuous and non-patterned layer, the sophisticated techniques will see through the layer and reveal the indicia. Consequently, it is most critical that the layer have some recognizable pattern to it in order to conceal the indicia. FIGS. 6–15 disclose several patterns which have been found to be successful in concealing indicia even though printed in colorless materials. The patterns are shown in FIGS. 6–15 in black ink for purposes of identification only. In the preferred embodiment of this invention these patterns would be invisible to visual examination.

In the past it has been customary to use a "barrier" layer of transparent material to protect indicia on a game card from compromise by "see through" and "show through" and from mutilation during mechanical removal of an opaque mask, see for instance U.S. Pat. Nos. 3,055,117; 2,986,820; and 2,961,777. Each of the barrier layers disclosed in these patents was a continuous and non-patterned layer which successfully protected the indicia from visual compromise and from physical destruction during mechanical removal of an opaque mask. However, the continuous barrier layer did not prohibit the discovery of the indicia by examination of the game card with a photocopy machine prior to removal of the opaque mask.

The pattern layers of the present invention are preferably composed of conventional printing materials such as pigmented and non-pigmented vehicles and standard overprint colored and non-colored varnishes. If a pigmented vehicle or a colored varnish is used in the present process the color tone must be adjusted so as to provide proper contrast with the indicia printed on the game card so that the indicia can be easily read once the opaque mask is removed. A typical example of a colorless overprint varnish for use in printing a patterned layer on top of the indicia is composed primarily of a urethane alkyd varnish plus small amounts of wax, driers and antioxidents. A typical example of a pigmented vehicle for use in printing a patterned layer beneath the indicia is composed of the following materials (all percentages are by weight):

| Ingredient | Percent |
| --- | --- |
| Oiticia oil | 7.5 |
| Bodied linseed oil, 60 poise | 19.0 |
| Refined linseed oil | 18.0 |
| Modified phenolic resin, melting point 130 to 140 degrees C | 23.0 |
| Petroleum solvent 500 to 550 degrees boiling point, F | 10.0 |
| Cobalt linoresinate, 4 percent metal | 1.0 |
| Lead-manganese paste drier | 1.0 |
| Benzidine yellow | 12.5 |
| Compound consisting of 70% by part of linseed oil, 25% by part of wax 4% by part of cup grease, and 1% by part of corn starch | 8.0 |

Figure 3:
FIG. 3 is a cross-sectional view of one embodiment of the present invention taken along line x—x of FIG. 1.
Figure 4:
FIG. 4 is a cross-sectional view of a second embodiment of the present invention taken along line x—x of FIG. 1.
Figure 5:
FIG. 5 is a cross-sectional view of a third embodiment of the present invention taken along line x—x of FIG. 1.

The patterned layers of the present invention may be referred to as the patterned intermediate layer when the layer is positioned immediately on top of the indicia and the patterned background layer when the layer is positioned immediately beneath the indicia. FIGS. 3–5 show the arrangements of various materials for the three embodiments of the present invention. In FIG. 3, the opaque mask 16 is the uppermost material. The next material beneath the mask is the patterned intermediate layer 18. The next material beneath the patterned intermediate layer is the printed indicia 14. The last material is the card stock material 12. In FIG. 4, the opaque mask 16 is uppermost. The next material beneath the mask is the printed indicia 14. The next material is the patterned background layer 20 and the final material is the card stock material 12. In FIG. 5, the opaque mask 16 is uppermost. The next material is the patterned intermediate layer 18. The following material is the printed indicia 14. The next material is the patterned background layer 20 and the final material is the card stock material 12. It should be clearly understood that these materials have been shown in a schematic sense for the purposes of illustration only and that the actual finished materials are very thin in cross-section as compared to the materials shown in FIGS. 3–5. In addition, certain non-essentialmaterials (non-essential for the purpose of understanding the present invention) such as the aluminum coatings on the card stock material, background color, background designs and messages, and other such material have been deleted. It is within the contemplation of the present invention to conceal indicia from discovery by sophisticated techniques by using patterned intermediate and background layers which are composed of a plurality of dots, bars, squares, lines (both parallel and non-parallel) and regular and irregular patterns of lines and shapes. The style, texture, tone and printing method used in the printing of the indicia should be taken into consideration in the selection of the form, size and shape of the pattern to be used in the pattern layers. In other words, the selection of the patterns for the patterned layers and the printing styles, texture, tone and the like for the indicia should be regulated by the fact that each should complement the other to effect optimum concealment. Thus it has been found that if an indicia is printed, for instance, in a fine dot pattern and a patterned overprint varnish layer is printed in the same fine dot pattern over the indicia, the indicia will be effectively concealed from compromise by a technique such as examination by a photocopy machine. This discovery is particularly unique in that fine dot patterns have been used in the past for a background pattern, but only with solid indicia and continuous intermediate or barrier layers of varnish, and those background layers have not precluded compromise of the game card with a photocopy machine.

As shown in FIGS. 6–15, a large number of different types of patterns have been considered and found to be effective in concealing indicia from compromise by a technique such as examination by a photocopy machine. From a review of the diversity of patterns considered, it is apparent that the essential criterion for the pattern layer is that it have a recognizable pattern and be anything but continuous and uniform. It has been found that the most effective concealment of indicia has been obtained with the use of the very irregular Chinese character pattern of FIG. 14 and the very irregular swirl pattern of FIG. 15. In these two patterns the arrangement of pattern areas is irregular and the interstices between pattern areas are irregular in shape. When examined with a suitable photocopy machine, the responsive surface of the machine detects confusion patterns rather than the indicia concealed beneath the opaque mask.

It should be understood that it is significant that there be an irregular relationship between the patterns employed in the patterned layers and the printed indicia in order to achieve desired security. As discussed earlier, when solid printed indicia are used together with a fine screen background dot pattern, the relationship between the dot pattern and the indicia is too regular and the indicia are subject to discovery. In addition, the fine screen dot pattern as previously used for a background tamper-proof pattern does not provide adequate "coverage" as discussed previously. When the relationship between the indicia and the patterned layers is irregular, adequate protection from compromise is obtained. Irregularity can be achieved by employing (1) standard solid lines for the indicia together with patterned layers as disclosed herein; (2) or by using a screen pattern for the printing of the indicia together with a similar or dissimilar screen pattern for the patterned layers as disclosed herein (the relationship between the screen pattern of the indicia and the patterned layers being automatically irregular); or by using a screen pattern for the indicia and patterned layers as disclosed herein.

In a preferred embodiment of the present invention, a very effective concealing arrangement is obtaind when a patterned layer is used both below and above the indicia. While successful results have been achieved when these two layers are used alone, much greater success has been obtained, as a general matter, when both layers are used together. In a most preferred embodiment of the present invention, the most complete concealment of indicia has been obtained through the use of the swirl pattern of FIG. 15 as the patterned background layer and the Chinese character pattern of FIG. 14 as the patterned intermediate layer.

While this invention has been described in detail with particular reference to preferred embodiments thereof, it will be understood that variations and modifications can be effected within the spirit and scope of the invention as described hereinbefore and as defined in the appended claims.

I claim:

1. A contest card for temporarily and completely concealing the presence, absence, position or nature of indicia printed on said card comprising a smooth surface card stock material having an upper surface and a lower surface, indicia printed on the upper surface of said card stock material, an opaque sectionally removable mask overlying said indicia, and a patterned intermediate layer of material positioned immediately above said indicia but beneath said opaque mask, said patterned layer being transparent so that an observer may read the indicia after removal of the mask.

2. Contest card of claim 1 including a patterned background layer of material positioned immediately below said indicia and on top of said upper surface of said card stock material.

3. Contest card for temporarily and completely concealing the presence, absence, position or nature of indicia printed on said card comprising a smooth surface card stock material having an upper surface and a lower surface, indicia printed on the upper surface of said card stock material, an opaque sectionally removable mask overlying said indicia, a patterned intermediate transparent layer of material positioned immediately above said indicia but beneath said opaque mask, and a patterned irregular background layer of material positioned immediately below said indicia and on top of said upper surface of said card stock material.

4. A contest card for temporarily and completely concealing the presence, absence, position or nature of indicia printed on said card comprising a smooth surface card stock material having an upper surface and a lower surface, indicia printed on the upper surface of said card stock material, an opaque sectionally removable mask overlying said indicia, a patterned intermediate layer of material positioned immediately above said indicia but beneath said opaque mask, said patterned layer being transparent so that an observer may read the indicia after removal of the mask, and a patterned irregular background layer of material positioned immediately below said indicia and on top of said upper surface of said card stock material.

5. Contest card of claim 4 wherein said indicia has sufficient color contrast with the patterned irregular layer to permit visual examination of the indicia.

* * * * *